Aug. 10, 1948. L. A. BELL 2,446,866
GLARE SCREEN FOR MOTOR VEHICLES
Filed Sept. 3, 1947 2 Sheets-Sheet 1
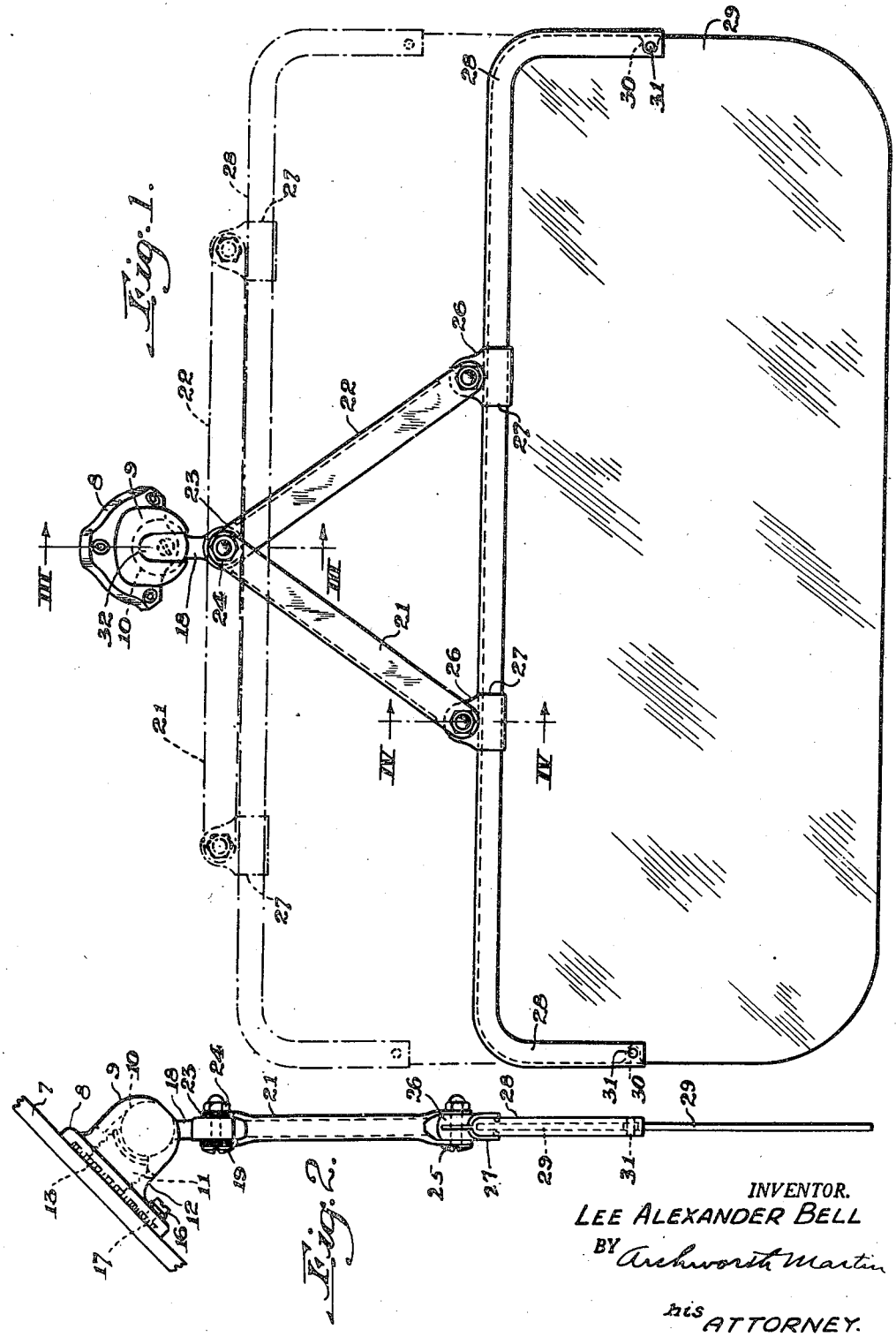
INVENTOR.
LEE ALEXANDER BELL
BY Archworth Martin
his ATTORNEY.

Aug. 10, 1948.   L. A. BELL   2,446,866
GLARE SCREEN FOR MOTOR VEHICLES
Filed Sept. 3, 1947   2 Sheets-Sheet 2

INVENTOR.
LEE ALEXANDER BELL
BY Archworth Martin
his ATTORNEY.

Patented Aug. 10, 1948

2,446,866

UNITED STATES PATENT OFFICE 2,446,866

GLARE SCREEN FOR MOTOR VEHICLES

Lee Alexander Bell, Valencia, Pa.

Application September 3, 1947, Serial No. 771,963

4 Claims. (Cl. 248—274)

My invention relates to glare screens that are placed in the line of vision between the user and a bright light, for the purpose of eliminating or reducing glare, and is here shown as employed in connection with an automobile windshield for the purpose of relieving the driver's eyes from the glare of on-coming head lights or bright sunlight.

The present invention contains an improvement upon that disclosed in my application Serial No. 770,141, filed August 22, 1947.

This invention has for its object the provision of a glare screen having a universal mounting whereby it may be set at various angular positions with respect to its fixed supporting element and which is also adjustable vertically with respect to the driver's line of vision.

Figure 3:
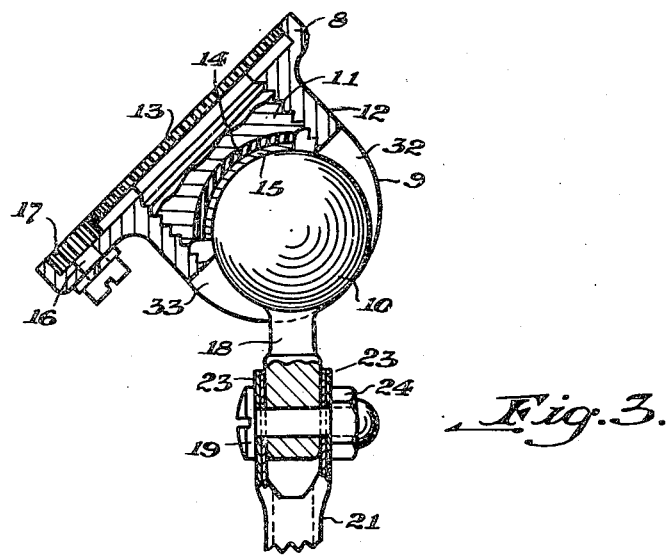
Figure 4:
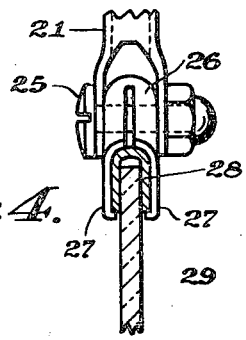
Figure 5:
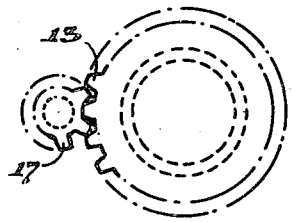

In the accompanying drawings, Figure 1 is a face view of the screen and its supporting members; Fig. 2 is an end view thereof; Fig. 3 is an enlarged view taken on the line III—III of Fig. 1; Fig. 4 is an enlarged view taken on the line IV—IV of Fig. 1, and Fig. 5 is a schematic plan view showing the adjusting pinion and gear of Figs. 2 and 3.

The screen is shown as mounted upon a wood strip 7 such as are mounted in an inclined position above the windshield, in various standard types of automobiles. A base plate 8 is connected to the strip 7 by screws and has a socket-like extension 9 to receive a ball member 10, the members 9 and 10 constituting part of a ball-and-socket joint.

A socket member 11 has a screw thread formed thereon for threaded engagement with the tubular-like extension 12 of the base 8. A toothed member 13, in the form of a gear wheel, is formed integrally with the member 11, so that when the gear wheel is turned, the plug-like socket member 11 will be screwed further into or out of the extension 12 of the base. A liner 14 of rubber or other soft material is provided in the socket member 11, and a metal plate 15 of dished form snugly fits the liner 14 and the ball 10. The metal of the ball 10 will preferably be of different hardness than the member 15 so as to give better friction. The liner disc 14, of course, gives a desired yieldability in the joint.

A stud 16 having a notched head for a screw driver is journaled in the base 8, and at its inner end, has a pinion 17 rigidly secured thereto and meshing with the gear wheel 13, so that when the stud 16 is turned by a screw driver, the threaded plug 11 will be rotated to change the tension and frictional force on the ball 10.

The ball 10 has a lug or extension 18 formed integrally therewith to receive a screw or bolt 19. A pair of links 21 and 22 of sheet-metal channel form have their flanges extended to form ears at 23 through which the bolt 19 extends. The bolt has threaded engagement with a nut 24 that has a rounded cap formed thereon for decorative effect.

At their lower or outer ends, the links 21—22 carry bolts 25 that, in turn, support clips 26 that are split as shown more clearly in Fig. 4, so that their finger portions 27 can be flexed toward one another through tightening of the bolts 25 by a screw driver.

The clips 26 partially embrace a metal channel 28 and can be drawn into tight frictional engagement therewith by turning the screws 25. By this arrangement, the frame 28 can be set at various heights, to bring it into proper position with respect to the driver's eyes. By loosening the screws 25 and sliding the clips along the frame 28, and perhaps also loosening the screw 19 at the upper ends of the links 21—22, the frame will be set at the desired height and the screws then tightened, the frictional engagement of the clips 27 serving to hold the glare screen at its adjusted height.

The channel frame 28 is of inverted U-form and receives the upper edge portion of a glare screen plate 29 which may be of a single sheet of tinted plate glass or may be of laminated form, with one of the glass laminations being tinted; or it may consist of two clear glass plates with a tinted adhesive film between them. Usually the glass will be adequately supported in the frame 28 by an adhesive, but when a more positive connection is required, the glass will be notched slightly at 30 to receive pins or studs 31 that extend through the channel frame 28.

The glare screen can be swung to any desired angular position, because of the ball-and-socket support, the socket 9 having recesses or slots cut into it at 32 and 33 to receive the boss 18 and thus allow a wider range of vertical swinging movement.

I claim as my invention:

1. A holder for a glare screen, comprising a joint element adapted for connection to a fixed support, a second joint element adjustably held by the other element, a pair of links pivotally connected at their upper ends to the second element, and means for frictionally connecting the lower ends of the links to an upper edge of a glare screen plate, for adjustment longitudinally thereof.

2. A holder for a glare screen, comprising a joint element adapted for connection to a fixed support, a second joint element adjustably held by the other element, a pair of links pivotally connected at their upper ends to the second element, a pair of clip members pivotally connected to the lower end of each link, and a screw for holding each pair of said members in clamped engagement with the upper edge of a screen.

3. A holder for a glare screen, comprising a pair of links adapted for pivotal connection at their upper ends, to a fixed support, and means for connecting the lower ends of the links to the upper edge of a glare screen, and for adjusting said ends relative to one another, in directions longitudinally of said edge.

4. A holder for a glare screen, comprising a pair of links adapted for pivotal connection at their upper ends, to a fixed support, means for connecting the lower ends of the links to the upper edge of a glare screen, for adjusting said ends relative to one another, in directions longitudinally of said edge, and means for adjustably positioning the lower portions of the links about an axis that is parallel to the said edge.

LEE ALEXANDER BELL.

REFERENCES CITED

The following references are of record in the file of this patent:

UNITED STATES PATENTS

| Number | Name | Date |
| --- | --- | --- |
| 1,420,268 | Hodny | June 20, 1922 |
| 1,958,934 | Williams | May 15, 1934 |